United States Patent [19]
Mukushi et al.

[11] 3,966,562
[45] June 29, 1976

[54] MULTI-STAGE FLASH DISTILLATION PLANT

[75] Inventors: Toshimi Mukushi; Kenkichi Izumi; Sankichi Takahashi; Yoshiaki Okazima; Toshio Sawa, all of Hitachi; Mithumasa Komai, Funabashi, all of Japan

[73] Assignee: Agency of Industrial Science & Technology, Tokyo, Japan

[22] Filed: July 31, 1974

[21] Appl. No.: 493,480

[52] U.S. Cl............................. 202/173; 202/176; 203/7; 203/11
[51] Int. Cl.²......................................... B01D 3/00
[58] Field of Search................... 202/173, 174, 176; 203/7, 10, 11; 159/DIG. 45

[56] References Cited
UNITED STATES PATENTS

| | | | |
|---|---|---|---|
| 3,218,241 | 11/1965 | Checkovich | 203/11 |
| 3,320,137 | 5/1967 | Jebens et al. | 202/173 |
| 3,401,094 | 9/1968 | Lindsay | 203/7 |
| 3,501,384 | 3/1970 | Starmer | 202/173 |
| 3,697,382 | 10/1972 | Porteous | 202/173 |
| 3,697,385 | 10/1972 | Tidball | 202/173 |

*Primary Examiner*—Curtis P. Ribando
*Attorney, Agent, or Firm*—Stewart and Kolasch, Ltd.

[57] ABSTRACT

A multi-stage distillation plant consisting essentially of a multi-flash evaporator provided with a multi-flash chamber which is divided into a heat recovery section and a heat rejection section. In this multi-stage flash distillation plant, the aforesaid flash evaporator is provided with a deaerator for deaerating cold sea water, a thickener for separating brine containing a relatively great amount of seeds, from concentrated brine which has been extracted from a front chamber of the final stage flash chamber, and a seed mixing tank for obtaining a seed-mixed brine, whereby part of the sea water which has passed through the deaerator is supplied as a feed sea water to the rear chamber of the final stage flash chamber, while the brine containing a relatively great amount of seed and extracted from the thickener is joined to the seed-mixed brine fed from the seed mixing tank. Thus, the confluent brine thus joined together is discharged for deaeration into the final stage flash chamber from a distributor provided in the rear chamber thereof. According to another aspect of the invention, the aforesaid deaerator is omitted and the feed sea water which has not been subjected to deaeration is joined to the aforesaid confluent brine and is discharged for deaeration from the distributor.

6 Claims, 3 Drawing Figures

MULTI-STAGE FLASH DISTILLATION PLANT

BACKGROUND OF THE INVENTION

1. Field of the Invention

This invention relates to a multi-stage flash distillation plant.

2. Description of the Prior Art

The prior art multi-stage flash distillation plant consists essentially of: a flash evaporator composed of a heat recovery section having several stage flash chambers and a heat rejection section having at least two stage flash chambers; a deaerator, thickener, seed mixing tank, brine recycling pump, brine extracting pump, brine heater, and the like. The cold sea water to be supplied to the heat rejection section is fed from the final flash chamber side through the deaerator, while part of the cold sea water thus supplied is discharged to the exterior and the remaining part thereof is supplied as feed sea water to the rear chamber of the final stage flash chamber. Simultaneously therewith, the seed-brine mixture is supplied from the seed-mixing tank to the rear chamber of the final stage flash chamber. The feed sea water and seed-mixed brine are mixed with the concentrated brine which has been fed into the rear chamber of the final stage flash chamber, and then pressurized by the brine circulating pump and fed through a condenser provided in the heat recovery section from the rear stage flash chamber in the heat recovery section, then through a first flash chamber into the brine heater for being heated therein, then into the first stage flash chamber for flash evaporation, through the succeeding flash chambers sequentially to give a concentrated brine and then into the final flash chamber. The concentrated brine present in the front chamber of the final stage flash chamber is fed by means of a brine extracting pump to the thickener, wherein the concentrated brine is separated into clean brine containing little seeds and brine containing a relatively great amount of seeds. The brine containing a relatively great amount of seeds is pressurized by means of a slurry circulating pump by way of a downflow pipe attached to the lower portion of the thickener and introduced to the discharge side of the flash circulating pump and then into the condenser in the final flash chamber of a heat recovery section. As a result, if the thickener is open to the atmosphere, then an air will be dissolved into the brine, thereby accelerating corrosion in the brine circulating system. For this reason, it is required that the thickener be prepared in air-tight fashion and nitrogen gas be fed into the thickener from a nitrogen bomb.

On the other hand, since air is possibly dissolved into the brine at the time of mixing seeds with brine in the seed-mixing tank, the seed-brine mixture is discharged from the distributor open in the rear chamber of the final stage flash chamber, into the aforesaid rear chamber for deaeration. However, there arises, in this respect, a disadvantage in that if a seed-mixed brine having a high seed concentration is supplied to the distributor, then there will be encountered clogging of the nozzle of the distributor.

As has been described thus far, with the conventional multi-stage flash distillation plant, the brine from the downflow pipe of the thickener is fed to the discharge side of the brine circulating pump, so that the pressure of brine should be increased. For this reason, a slurry circulating pump is provided, and nitrogen gas is sealingly filled in the thickener so as to prevent the dissolution of air into the brine. Thus, this adds to the cost of the water produced.

Furthermore, it remains desired that the deaerator for deaerating the feed sea water be omitted and, in addition that, the seed concentration of the seed-brine mixture to be supplied to the distributor is reduced.

Accordingly, it is the first object of the present invention to provide a multi-stage flash distillation plant which dispenses with a slurry circulating pump and the need to sealingly fill nitrogen gas the thickener.

It is the second object of the present invention to provide a multi-stage flash destillation plant which dispenses with a deaerator for deaerating feed sea water and which prevents clogging of the nozzle of a distributor by lowering the seed concentration of the seed-brine mixture.

These and other objects and advantages of the present invention will become fully apparent from the following description when read in conjunction with the accompanying drawings.

SUMMARY OF THE INVENTION

According to the first aspect of the present invention which provides a multi-stage flash distillation plant, there is provided a multi-flash evaporator in which: a multi-stage flash chamber housing therein, a condenser and a receiving tray for fresh water is divided into a heat recovery portion in its front stage and a heat rejection portion in its rear stage. Cold sea water is introduced from the final stage flash chamber side into the condenser in the heat rejection portion and then fed through the deaerator. Part of the cold sea water thus fed is introduced as feed sea water into the rear chamber of the final stage flash chamber for mixing with the concentrated brine which has been fed from the front stage flash chamber thereof. The brine thus mixed is introduced by means of a brine circulating pump from the final stage flash chamber side of the heat recovery portion into the condenser in the aforesaid heat recovery portion. The multiflash evaporator is provided with a thickener for separating the brine containing relatively a great amount of seeds, from the concentrated brine which has been extracted by means of a brine extracting pump from the front chamber of the final stage flash chamber, and a seed mixing tank is provided for preparing a seed-brine mixture, whereby the brine containing a relatively great amount of seeds and extracted from the thickener is joined to the seed brine mixture fed from the seed-mixing tank, so that the brine thus joined is discharged from a distributor provided in the rear chamber of the final stage flash chamber into the final stage flash chamber for deaeration.

According to the second aspect of the present invention, the deaerator is omitted from the multi-stage flash distillation plant as defined in the first embodiment and the feed sea water which has not been deaerated is with the aforesaid joined confluent brine and then the brine thus joined is discharged for deaeration from the distributor.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
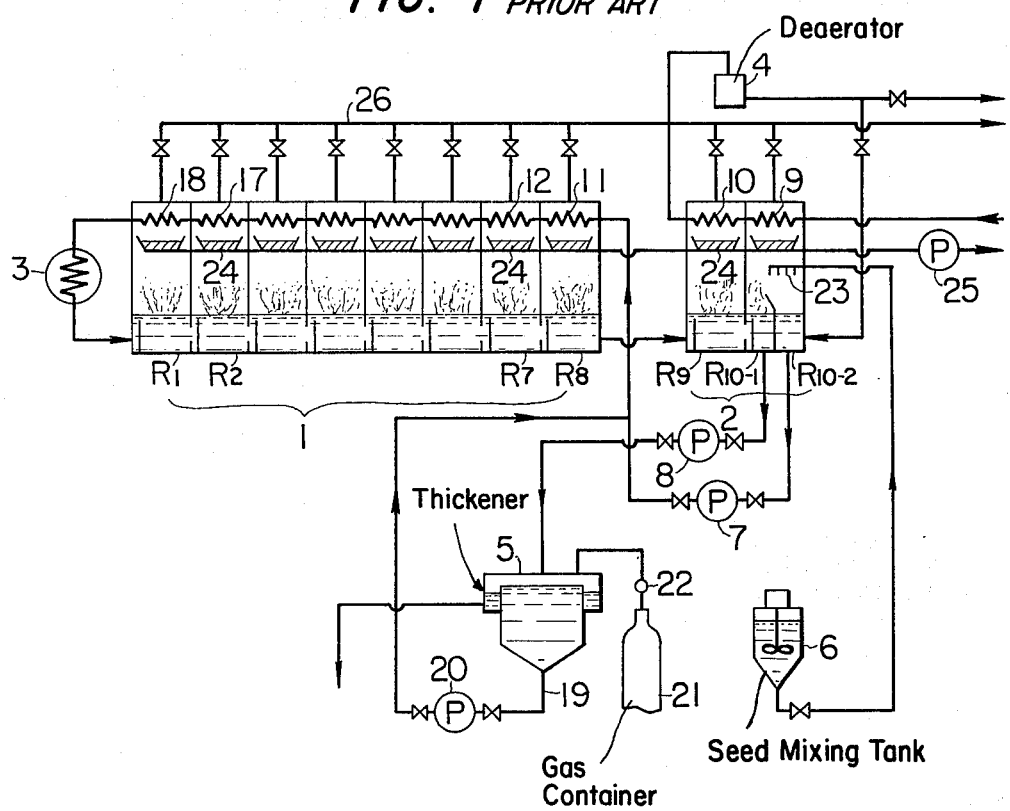
FIG. 1 is a schematic illustration of the prior art.

For better understanding of the principle incorporated in the present invention, the description will first be made of the conventional 10 stage flash distillation plant by referring to FIG. 1.

The essential part of the plant shown consists of: a flash evaporator composed of a heat recovery section 1 provided with the 1st to 8th stage flash chambers R1 to R8 and a heat rejection section 2 provided with the 9th to 10th stage (the final stage) flash chambers R9 and R10; a brine heater 3, a deaerator 4, a thickener 5, a seed-mixing tank 6, a brine circulating pump 7, a brine extracting pump 8 and the like.

The cold sea water through the heat rejection section 2 is introduced into a condenser 9 in the final stage flash chamber R10 and then through a condenser 10 in the 9th flash chamber R9 and deaerator 4, sequentially, whereby part of the cold sea water thus introduced is fed to the rear chamber R10-2 of the final stage flash chamber R10, while the remaining cold sea water is discharged to the exterior. The sea water to be supplied to the rear chamber R10-2 of the flash chamber R10 is mixed with a concentrated brine from the front chamber R10-1 of the flash chamber R10, and then pressurized by means of brine circulating pump 7, after which the brine is introduced through condensers 11 to 18 in the 8th to 1st flash chambers R8 to R1 and then heated in the brine heater 3, and fed into the first stage flash chamber R1, then into the final stage flash chamber R10 under flash evaporation. The concentrated brine introduced into the front chamber R10-1 of the flash chamber R10 is fed by mean of the extracting pump 8 to the thickener 5. In the thickner 5, the brine is separated into the clean brine containing little seeds therein, and the brine containing a relatively great amount of seeds. The brine containing a relatively great amount of seeds is fed through a down-flow pipe 19 attached to the lower portion of the thickener 5 and to a slurry circulating pump 20 which introduces said brine to the discharge side of a brine circulating pump 7 and then into the condenser 11 in the 8th flash chamber R8. The clean brine is discharged through the top portion of the thickener 5 to the exterior.

In this respect, if the thickener 5 is open to the atmosphere, air will be dissolved into the brine which is being discharge therefrom, thereby accelerating the corrosion in the brine circulating system. For this reason, the thickener 5 should be prepared in an air-tight manner, and accordingly nitrogen gas is fed from a nitrogen gas bomb 21 by way of a pressure reducing valve 22 into the thickener 5.

On the other hand, since air is also dissolved in the seed mixing tank 6 at the time of mixing the seeds, the seed-brine mixture is discharged into the final stage flash chamber R10 from the distributor 23 provided in the rear chamber R10-2 of the flash chamber R10 for deaeration.

Provided in the respective stage flash chambers are trays 24 for receiving fresh water, and the fresh water received in the tray 24 is extracted to the exterior by means of a fresh water pump 25 as fresh water is produced. In addition, connected to the respective stage flash chambers are pipe lines for extracting to the exterior, non-condensable gas in the respective chambers by means of an ejector (not shown).

The conventional plant requires the aforesaid slurry circulating pump 20 and requires a sealed thickener 5 with a nitrogen atmosphere, presenting a high production cost of water. According to the plant or the first embodiment of the invention, the aforesaid needs are eliminated.

Description will now be made of the plant according to the present invention in conjunction with FIG. 2 hereunder, in which like parts are designated with like reference numerals throughout FIGS. 1 and 2.

There is provided an open type thickener 27. In this case, the concentrated brine which has been introduced from the front chamber R10-1 of the final stage flash chamber R10 is separated into clean brine containing little seeds, and brine containing a relatively great amount of seeds. The clean brine is discharged as a blow-down through a discharge pipe 28 to the exterior. The brine containing a relatively great amount of seeds is discharged through the down-flow pipe 29 of the thickener 27, through the distributor 23 and into the final flash chamber R10, the aforesaid distributor 23 being disposed within the final flash chamber R10 which has a high vacuum degree, whereby the air dissolved into the brine in the thickener 27 is removed. On the other hand, the seed-mixed brine fed from the seed mixing tank 6, as well, is joined with the brine circulating from the thickener 27 midway along the pipe which leads from the thickener 27 to the distributor 23, and is discharged from the distributor 23 for deaeration. The first embodiment or plant of the present invention is arranged in the aforesaid manner, so that the first object of the present invention may be achieved, thus saving the production cost of water to a large extent.

Meanwhile, with the first plant according to the present invention, there still arises a possibility clogging of the nozzle of the distributor in the case where the seed concentration in the brine is relatively high. It remains desired then to avoid the aforesaid disadvantage and to eliminate the deaerator 4 for deaerating the feed sea water. The plant or second embodiment of the present invention is directed to avoiding the aforesaid disadvantage. This plant is shown in FIG. 3, in which like parts are used to designated like reference numerals in common with FIG. 2.

In this embodiment, the confluent brine comprising the brine which contains a relatively great amount of seeds and has been fed through the down-flow pipe 29 from the thickener 27, and the seed-mixed brine from the seed-mixing tank 6 is joined to part of the cold sea water as feed sea water which has been introduced through condensers 9 and 10 in the heat rejection section 2 for eventual discharge from the distributor 23. The other constructions are entirely the same as those shown in FIG. 2.

Figure 2:
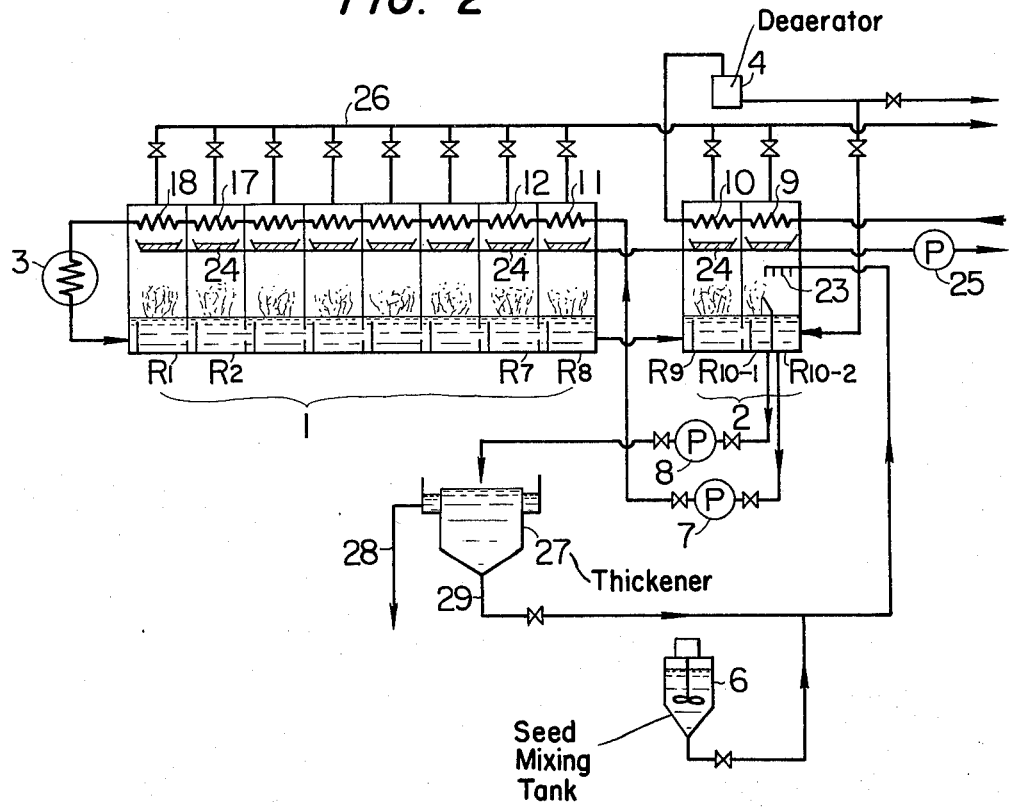
FIG. 2 and FIG. 3 are schematic illustrations of the apparatus of the present invention.
Figure 3:
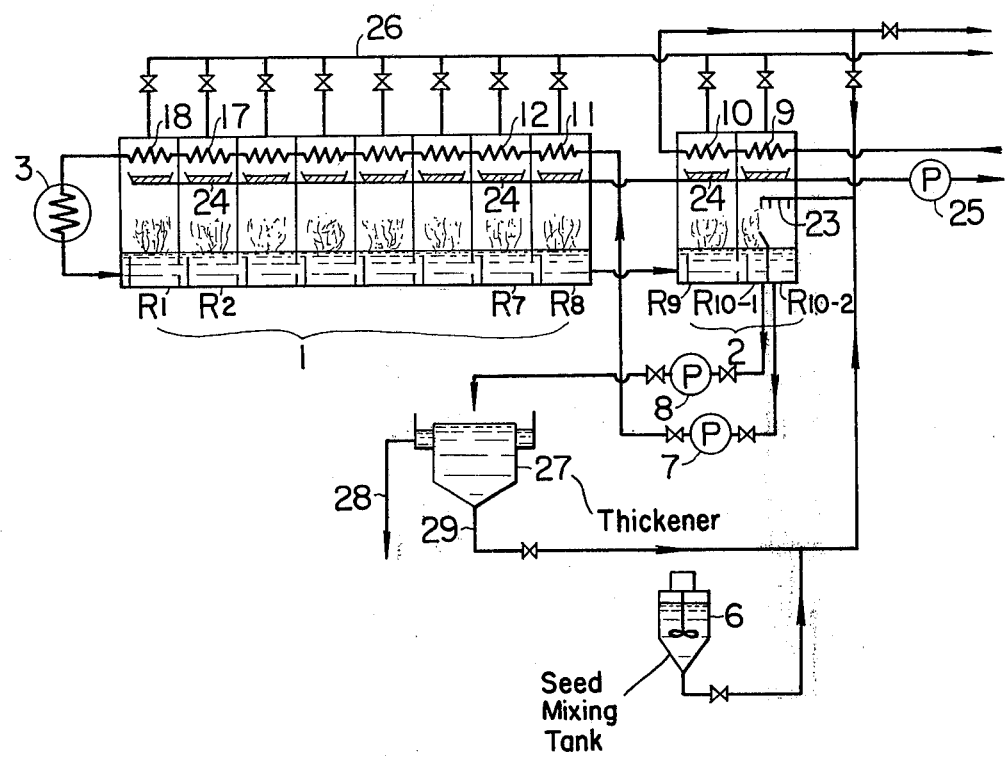

As is apparent from the foregoing description, the aforesaid second embodiment of the invention will prevent clogging of the nozzle of the distributor 23 by lowering the seed concentration of the seed-mixed brine to be supplied from the seed mixing tank 6 to the distributor 23, while dispensing with the deaerator 4 adapted to effect the deaeration of the feed sea water, thereby reducing the equipment cost to a degree lower than that of the plant or embodiment shown in FIG. 2. In addition, the second embodiment lends itself to a smaller construction, with the attendant advantage of reducing the production cost of water.

The invention being thus described, it will be obvious that the same may be varied in many ways, such variations are not to be regarded as a departure from the spirit and scope of the invention, and all such modifications are intended to be included within the scope of the following claims.

what is claimed is:

1. A multi-stage flash distillation plant comprising:
a plurality of flash distillation stages divided into a heat recovery section and a heat rejection section, each of said stages including a flash chamber and a condenser with the last stage of the heat rejection section having a front flash chamber and a rear flash chamber;
a brine circulating pump means and associated conduit means providing communication between the rear flash chamber of said heat rejection section and the first condenser of the heat recovery section for sequentially circulating unflashed brine and a condensing medium through the condensers of each of the flash distillation stages of the heat recovery section;
a brine heater means and associated conduit means providing communication between the final condenser and the first flash chamber of said heat recovery section for heating unflashed brine prior to its introduction into said first flash chamber;
means for introducing feed sea water sequentially through the condensers of the heat rejection section, and deaerator means disposed downstream of the final condenser of the heat rejection section for receiving said sea water and means for introducing at least a portion of the deaerated feed sea water from the deaerator means to the rear flash chamber of the last stage of the heat rejection section;
an open thickener container;
a brine extracting pump and associated conduit means for conveying the flashed and concentrated brine from the front flash chamber of the last stage of the heat rejection section to said open-type thickener container for separating the flashed and concentrated brine into clean brine containing a small amount of seeds as discharged brine and the brine containing a relatively large amount of seeds as recovered brine;
a seed mixing tank for preparing new seed-mixed brine; and
a distributor means provided with nozzle means and disposed in the rear flash chamber of the last stage of the heat rejection section and means for combining the recovered brine from the thickener container and the new seed-mixed brine and introducing the mixture to said distributor means, whereby the brine mixture is deaerated.

2. The multi-stage flash distillation plant of claim 1, wherein each of said flash chambers is connected with a common discharge means for non-condensible gas.

3. The multi-stage flash distillation plant of claim 1, wherein a tray is disposed in each of said flash distillation stages below said condensers.

4. A multi-stage flash distillation plant comprising: a plurality of flash distillation stages divided into a heat recovery section and a heat rejection section, each of said stages including a flash chamber and a condenser, with the last stage of the heat rejection section having a front flash chamber and a rear flash chamber;
a brine circulating pump means and associated conduit means providing communication between the rear flash chamber of said heat rejection section and the first condenser of the heat recovery section for sequentialy circulating unflashed brine as a condensing medium through the condensers of each of the flash distillation stages of the heat recovery section;
a brine heater means and associated conduit means providing communication between the final condenser and the first flash chamber of said heat recovery section for heating unflashed brine prior to its introduction into said first flash chamber;
means for introducing feed sea water sequentially through the condensers of the heat rejection section;
an open-type thickener container;
a brine extracting pump and associated conduit means for conveying the flashed and concentrated brine from the front flash chamber of the last stage of the heat rejection section to said open-type thickener container for separating the flashed and concentrated brine into clean brine containing a small amount of seeds as discharged brine and the brine containing a relatively large amount of seeds as recovered brine;
a seed mixing tank for preparing new seed-mixed brine; and
a distributor means provided with nozzle means and disposed in the rear flash chamber of the last stage of the heat rejection section and means for combining the recovered brine from the thickener container, the new seed-mixed brine and at least a portion of the feed sea water recovered from the final condenser of the heat rejection section and introducing the mixture to said distributor means, whereby the brine mixture is deaerated.

5. The multi-stage flash distillation plant of claim 4, wherein each of said flash chambers is connected with a common discharge means for non-condensible gas.

6. The multi-stage flash distillation plant of claim 4, wherein a tray is disposed in each of said flash distillation stages below said condensers.

* * * * *